United States Patent [19]

Corral et al.

[11] Patent Number: 4,966,451

[45] Date of Patent: Oct. 30, 1990

[54] EYEGLASS FLOTATION APPARATUS

[76] Inventors: Edward D. Corral, 6046 N. 21st Dr., Phoenix, Ariz. 85015; Steven R. Lopez, 4927 W. McClellan Rd., Glendale, Ariz. 85301

[21] Appl. No.: 333,613

[22] Filed: Apr. 5, 1989

[51] Int. Cl.$^5$ ............................ G02C 1/00; G02C 5/22
[52] U.S. Cl. ......................................... 351/43; 351/158
[58] Field of Search ...................... 351/43, 158; 2/448, 2/449, 450

[56] References Cited

U.S. PATENT DOCUMENTS 3,016,796  1/1962  Boothe .................................... 351/43

FOREIGN PATENT DOCUMENTS 1579956  6/1969  France .................................. 351/43

Primary Examiner—Rodney B. Bovernick
Attorney, Agent, or Firm—Cahill, Sutton & Thomas

[57] ABSTRACT

A temple mounted flotation device for eyeglasses is detachably attached for use during water related activities to prevent sinking and loss of the eyeglasses. The location of mounting in combination with the shape of the flotation device(s) affords lateral shading of the eye. The mounting structure permits alternative attachment of the flotation device to a head or neck band secured to the glasses.

13 Claims, 1 Drawing Sheet

EYEGLASS FLOTATION APPARATUS

BACKGROUND OF THE INVENTION

1. FIELD OF THE INVENTION

The present invention relates to flotation devices and, more particularly, to eyeglass mounted flotation devices.

2. DESCRIPTION OF THE PRIOR ART

Most prescription eyeglasses will sink in water, whether fresh water or salt water. For those who must use prescription glasses during participation in water related activities, such as sailing, water skiing and fishing, a fear always exists that the eyeglasses will fall into the water and be lost. Various non prescription sunglasses are made of low density frames to render them unsinkable. Generally, these types of eyeglasses are relatively inexpensive and usually of little stylish merit. Stylish and high quality non prescription sunglasses are far too dense to float and will sink, like most prescription eyeglasses. Since the cost of prescription eyeglasses and stylish non prescription eyeglasses is substantial, a real dilemma exists between the desire to wear eyeglasses and the fear of losing them.

One widely used solution to this dilemma is that of wearing a headband or neck band in conjunction with the eyeglasses. This solution is satisfactory in many circumstances. It is not, however, an acceptable solution during certain activities, such as water skiing. Even the best water skiers will lose their balance and hit the water with some force. The sudden forceful impingement of the water against any eyeglasses worn will invariably carry them off the wearer's head. Once off the head, the head or neck band is of little use and the eyeglasses will sink. Other water related activities such as surfing, sailboat racing and speedboating present similar real risks to loss of one's eyeglasses.

Recognizing that a headband or neck band might remain attached to the glasses after they are knocked off a user's head, some attempts have been made to use the head or neck band as a flotation device. These efforts have been relatively unsuccessful in that an insufficient amount of flotation is available without creating an awkward, uncomfortable or unsightly headband or neck band. Other efforts to provide a flotation capability to eyeglasses include the use of a sealed canister attachable to the temple of a pair of eyeglasses by a spring loaded hook; such devices are similar to spherical floats widely used for years by fishermen. Devices of this type are capable of providing sufficient flotation but other problems exist. One of the main deterrents against use of such a canister type device is that it will bang against a user's head. The banging is uncomfortable. Moreover, the canister, regardless of shape, is relatively unsightly.

The cost of a detachably attachable canister type flotation device is generally considered too high to render such devices disposable. Accordingly, they must be stored and transported during nonuse, which is a bother and a nuisance. Considering that bathing suits usually do not have pockets for holding things like such canisters, transporting such a canister to one's car or boat at the end of a long day on the water can become a real irritation.

SUMMARY OF THE INVENTION

A flotation device of spongy foamlike material includes a lengthwise slit for receiving and enclosing the temple of a pair of eyeglasses. Depending upon the resiliency and flexibility of the material, a simple rubber band may be wrapped about the flotation device to maintain the slit closed and the temple enclosed therewithin. Depending upon the density of the pair of eyeglasses as a whole, sufficient flotation may be provided by a single flotation device mounted on one temple or by a flotation device mounted on each temple. By constructing the flotation device in the shape of a truncated equiangular triangle and mounting it with the base adjacent the eyeglass frame, shade against laterally impinging direct and reflected sunlight is provided. The slit extending through the flotation device accommodates insertion of a neck band or headband, should such mounting for the flotation device be preferred by a user. For very heavy eyeglasses, the flotation capability may be doubled or tripled by adhesively stacking the flotation devices.

It is therefore a primary object of the present invention to provide a detachably attachable flotation device for eyeglasses.

Another object of the present invention is to provide a temple supported flotation device for eyeglasses.

Still another object of the present invention is to provide a flotation device detachably attachable to the temple, headband or neck band of a pair of eyeglasses.

Yet another object of the present invention is to provide a soft yieldable flotation device for use with eyeglasses.

A further object of the present invention is to provide inexpensive disposable flotation devices for eyeglasses.

A still further object of the present invention is to provide a flotation device for eyeglasses which will shade the eye against lateral direct and reflected light.

A yet further object of the present invention is to provide a method for adding flotation to eyeglasses.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which.

DESCRIPTION OF THE PREFERRED EMBODIMENT

The wearing of eyeglasses or sunglasses in conjunction with any activities carried out on or in proximity to a body of water presents a risk of the eyeglasses or sunglasses falling into the water. As almost all prescription eyeglasses and most sunglasses are too dense to float, the risk of irretrievable loss is great. This risk is further enhanced when the wearer engages in activities more strenuous than bovine sunbathing. To help keep the eyeglasses or sunglasses in place, many wearers use headbands attached to the temples and extending about the head. Without question, such headbands will provide assistance in keeping the eyeglasses or sunglasses in place. However, should the wearer fall into the water or be struck by a wave, the force of the water acting upon the eyeglasses or sunglasses will invariably dislodge them. There is always also the possibility of the eyeglasses or sunglasses falling into water during handling or sliding into the water from a supporting surface. Once the eyeglasses or sunglasses reach the water they, invariably, will sink. Except for well defined environments, such as spas or pools, retrieval of the eyeglasses or sunglasses falling into the water is almost always impossible. Not only does such loss cause inconvenience but in many cases, particularly with prescription eyeglasses or designer sunglasses, a substantial monetary loss will also be incurred.

In recognition of the inevitable fact that eyeglasses and sunglasses do fall into the water for any number of reasons, an inexpensive, easily used and comfortable flotation device has been developed to maintain floating the eyeglasses or sunglasses and permit their retrieval.

Figure 1:
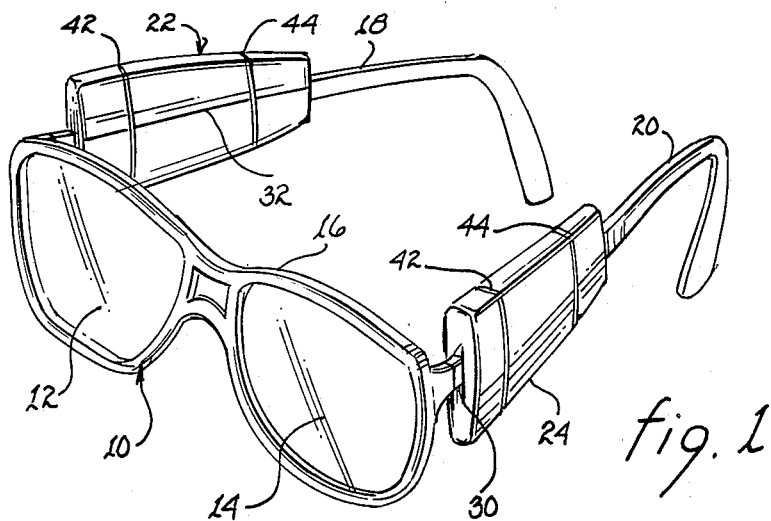
FIG. 1 is a perspective view of flotation devices mounted upon the temples of a pair of eyeglasses.

Referring to FIG. 1 there is illustrated a representative pair of eyeglasses or sunglasses 10. A pair of lenses 12,14 are mounted within a lens frame 16. A pair of temples 18,20 are pivotally attached to frame 16. These temples extend rearwardly for engagement with a user's ear to maintain the sunglasses in place in the conventional manner.

A first pad 22 of foam is mounted upon temple 18 and a second pad 24 of foam is mounted upon temple 20. The foam is preferably of low density lightweight non porous flexible and resilient foam to provide substantial buoyancy per unit volume for an extended period of time. Foam found particularly useful for this purpose is known as ethyl foam; sometimes this foam is referred to as ethafoam. Foam sold under the trademark Trocellane may also be used. Clearly, other compositions having the desired properties may be used.

Figure 3:
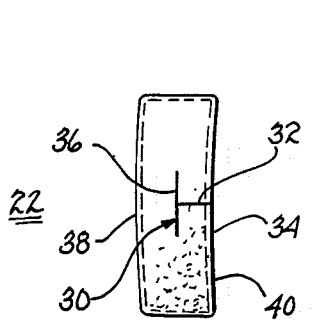
FIG. 3 is an end view of the flotation device.
Figure 2:
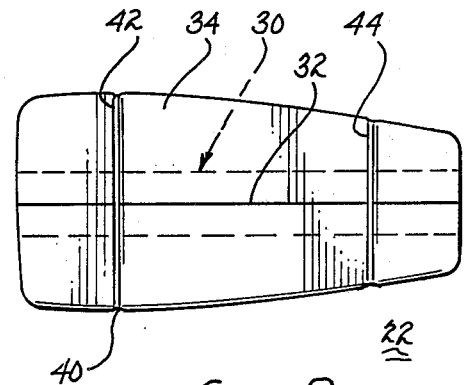
FIG. 2 is a side elevational view of the flotation device.

As particularly illustrated in FIGS. 1, 2 and 3, each of pads 22 and 24 includes a slot for receiving and enclosing a segment of the respective temple. Since the width and thickness of the temples of eyeglasses and sunglasses vary, a slot is particularly well suited for accommodating temples of varying cross sectional configuration. Depending upon the resilience and flexibility of the foam used for pads 22,24, retaining means may or may not be necessary to maintain the pads upon the temples.

In particular, the details of pad 22, which is a mirror image of pad 24, will be discussed with reference to FIGS. 2 and 3. A channel or slot 30 extends longitudinally through pad 22. It includes a first horizontally oriented slit 32 extending from side 34 of the pad to a point approximately mid center of the pad. A second vertical slit 36 interconnects with slit 32. The intersection of slit 32 with slit 36 may be at the midpoint of slit 36, as illustrated; alternatively, it may be at the upper end, the lower end or at any point therebetween. By bending pad 22 toward side 38, slits 32 and 36 will open to permit insertion of temple 18 within slit 36. Upon release of the pad, the resiliency of the pad will urge the pad to unbend and the temple will become enclosed within slit 36. For very thick temples, it may be necessary to widen slit 36 into a channel to accommodate the temple and permit essentially complete closure of slit 32.

A force acting slowly or abruptly upon one of pads 22,24 may tend to disengage the pad from the attached temple. Were such disengagement to come about, the flotation provided by the pad would, of course, be lost.

To discourage inadvertent disengagement of a pad from a temple, retention means may be added to restrain opening of slit 32. Retention means found particularly useful and sufficient to withstand reasonable attempts to dislodge or disengage the pads are simple rubber bands. Not only are such rubber bands widely available but their cost is very nominal. To maintain the rubber bands in place and to preserve an aesthetic value of the pads, slots 40,42 extend transversely about pad 22. These slots may be 1/16' in width and depth to accommodate small sized rubber bands. The compressive force provided by these rubber bands will tend to maintain slit 32 closed. As long as this slit is closed, the temple cannot become disengaged from the pad due to a laterally imposed force upon the pad. The likelihood of the pad sliding longitudinally along the temple and thereby becoming disengaged is very low due to the inherent friction present between the pad and the temple.

By locating pads 22,24 along the temples relatively close to frame 16, not only is flotation provided but a second benefit will be realized. The pads will serve in the manner of shades for the eyes against laterally impinging direct and reflected light. For aesthetic and comfort purposes, the pads may be tapered rearwardly in width, as illustrated. In practice, it has been learned that pads 22,24, bearing with slight pressure against a user's head, will tend to help anchor the eyeglasses in place during normal and even during athletic activities.

Pads 22,24 may be planar or curved inwardly. Depending upon the weight of the glasses to be floated and the density of the foam from which pads 22 and 24 are manufactured, the pads may be of a thickness ranging from $\frac{3}{8}$' to $\frac{1}{4}$'. The length of each pad may range from 1 $\frac{3}{4}$' to 2 $\frac{1}{4}$'. The width of the wide (front) end may range from $\frac{3}{4}$' to 1 $\frac{1}{4}$' and the width of the narrow (rear) end may range from $\frac{5}{8}$' to 1'.

Figure 4:
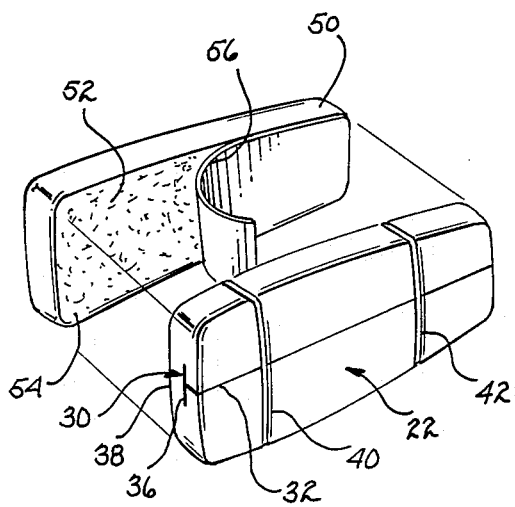
FIG. 4 illustrates a manner of doubling the flotation capability of the flotation device.
Figure 5:
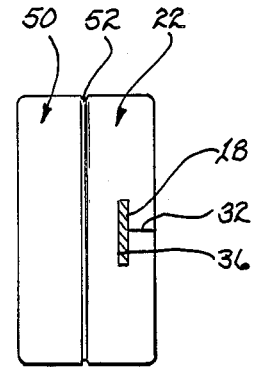
FIG. 5 is an end view of the variant shown in FIG. 4.

For extra heavy glasses or where constraints exist on the length of pads 22,24, the thickness of the pads may be doubled, as illustrated in FIGS. 4 and 5. A second pad 50, commensurate in planform with pad 22, may be adhesively secured to side 38 by adhesive 52. The adhesive employed is placed upon mating surface 54 of pad 50. It may be protected prior to adhesion of pad 50 by a protective peelable cover 56. After adhesive attachment of pad 50, a double thickness pad will be attached to temple 18, as illustrated in FIG. 5. A similar double thickness pad 24 would be attached to temple 20. As pad 50 is attached on the outer side of the temple engaging pad, the additional thickness will not interfere with the comfort of wearing eyeglasses 10 and it will not be noticed by the user. The additional weight of pad 50 is essentially negligible and not readily noticeable.

The cost of the foam used for pads 22,24 is very low and with conventional and available manufacturing techniques, the costs of production are nominal on a per pad pair basis. Such low material and manufacturing costs permit the pads to be treated as disposable items. Accordingly, they may be discarded after use and replaced the next time the user intends to engage in water related activities.

Certain adaptations with respect to the location of slot 30 within each pad may be made in conformance with certain eyeglasses that have relatively low mounted temples, temples of particular and unique cross sectional configuration and shortened temples used primarily with children's eyeglasses. Retention means, such as the rubber bands, may or may not be needed, depending upon the physical characteristics of the foam material. Moreover, other attachment means such as strips of mating hook and loop material sold under the trademark Velcro could be employed for more permanent or nondisposable configurations. In place of slot 30 having a horizontal slit 32, a channel extending longitudinally through the pad could be employed and the pad could be of the configuration shown or in the form of a cylinder; in such event, the temple of the eyeglasses would be threaded through the channel to mount the pad. In a further embodiment, the pad may be rolled about the temple and secured in place by a rubber band or adhesive strip.

While the principles of the invention have now been made clear in an illustrative embodiment, there will be immediately obvious to those skilled in the art many modifications of structure, arrangement proportions, elements, materials and components used in the practice of the invention which are particularly adapted for specific environments and operating requirements without departing from those principles.

We claim:

1. A flotation device for eyeglasses having temples extending from a lens enclosing frame, said device comprising in combination:
   (a) a pad extending longitudinally along a temple for providing flotation;
   (b) a channel extending longitudinally through said pad for receiving one of the temples, said channel comprising a first slit extending from a side of said pad and a second slit intersecting said first slit to form a T shaped channel; and
   (c) means for restraining lateral disengagement of said pad from the temple.

2. A flotation device for eyeglasses having temples extending from a lens enclosing frame, said device comprising in combination:
   (a) a pad extending longitudinally along a temple for providing flotation;
   (b) a channel extending longitudinally through said pad for receiving one of the temples, said channel comprising a first slit extending from a side of said pad and a second slit intersecting said first slit, said second slit being oriented orthogonal to said first slit; and
   (c) means for restraining lateral disengagement of said pad from the temple.

3. The device as set forth in claim 2 wherein said first slit is orthogonal to the side of the pad.

4. A flotation device for eyeglasses having temples extending from a lens enclosing frame, said device comprising in combination:
   (a) a pad extending longitudinally along a temple for providing flotation;
   (b) a channel extending longitudinally through said pad for receiving one of the temples;
   (c) means for restraining lateral disengagement of said pad from the temple, said restraining means comprising a rubber band disposed about said pad; and
   (d) a slot extending about at least one side of said pad for receiving said rubber band.

5. A flotation device for eyeglasses having temples extending rom a lens enclosing frame, said device comprising in combination:
   (a) a pad extending longitudinally along a temple for providing flotation;
   (b) a channel extending longitudinally through said pad for receiving one of the temples;
   (c) at least one slot circumscribing said pad; and
   (d) means for restraining lateral disengagement of said pad from he temple, said restraining means comprising a rubber band removably disposed within said slot.

6. The device as set forth in claim 5 including a further slot disposed bout said pad, said further slot being longitudinally displaced from said slot and wherein said restraining means comprises a further rubber band removably disposed within said further slot.

7. The device as set forth in claim 5 wherein said channel comprises a first slit extending from a side of said pad and a second slit intersecting said first slit.

8. The device as set forth in claim 7 wherein said second slit is oriented orthogonal to said first slit.

9. The device as set forth in claim 8 wherein said first slit is orthogonal to the side of the pad.

10. The device as set forth in claim 9 including a further slot disposed about said pad, said further slot being longitudinally displaced from said slot and wherein said restraining means comprises a further rubber band removably disposed within said further slot.

11. A method for providing flotation to eyeglasses having temples extending rom a lens supporting frame, said method comprising the step of:
    (a) mounting a pad of low density flexible resilient foam longitudinally along at least one temple;
    (b) said step of mounting including the step of inserting a length of the temple within a T shaped channel extending longitudinally along the pad; and
    (c) restraining lateral disengagement of the pad from the temple.

12. The method as set forth in claim 11 wherein the channel includes a slit forming the base of the T shaped channel and extending to one side of the pad and wherein said step of restraining includes the step of retaining the slit closed after insertion of the length of temple within the channel.

13. The method as set forth in claim 12 wherein said step of retaining includes the step of encircling the pad with a rubber band.

* * * * *